United States Patent [19]

Joichi et al.

[11] Patent Number: 4,476,555

[45] Date of Patent: Oct. 9, 1984

[54] TRACKING SERVO APPARATUS FOR AN OPTICAL INFORMATION REPRODUCING SYSTEM

[75] Inventors: Yoshiro Joichi, Tokyo; Hiroshi Ohki, Kawasaki, both of Japan

[73] Assignee: Sony Corporation, Tokyo, Japan

[21] Appl. No.: 534,931

[22] Filed: Sep. 26, 1983

Related U.S. Application Data

[63] Continuation of Ser. No. 299,537, Sep. 4, 1981, abandoned.

[30] Foreign Application Priority Data

Sep. 12, 1980 [JP] Japan ................................ 55-126877

[51] Int. Cl.³ ........................................... G11B 21/10
[52] U.S. Cl. ...................................... 369/44; 369/96; 250/202
[58] Field of Search ........................... 369/46, 44, 120; 250/202; 360/77; 318/577

[56] References Cited

U.S. PATENT DOCUMENTS

| | | | |
|---|---|---|---|
| 4,037,252 | 7/1977 | Janssen ................................ | 250/202 |
| 4,067,044 | 1/1978 | Maeda ................................ | 369/44 |
| 4,205,338 | 5/1980 | Schaefer ................................ | 369/46 |

FOREIGN PATENT DOCUMENTS 56-47932 4/1981 Japan ................................ 369/46

Primary Examiner—Alan Faber
Attorney, Agent, or Firm—Lewis H. Eslinger; Alvin Sinderbrand

[57] ABSTRACT

A tracking control apparatus for use with an optical information reproducing system in which information to be reproduced is formed on a surface of a recording carrier with a substantially circular record track, and a light beam is incident on the surface for reading the information, the apparatus including a photo-detector for detecting the light beam reflected from the recording carrier and generating an information signal and a first tracking error signal, the first tracking error signal being responsive to deviations by the light beam from the center of the record track; a tracking control apparatus receiving the first tracking error signal for adjusting the position of the light beam in response thereto; a measuring device for generating a second tracking error signal indicative of the eccentricity of the record track; and a circuit for supplying the second tracking error signal to the tracking control apparatus to adjust the position of the light beam in response thereto.

10 Claims, 11 Drawing Figures

4,476,555

TRACKING SERVO APPARATUS FOR AN OPTICAL INFORMATION REPRODUCING SYSTEM

This is a continuation of application Ser. No. 06/299,537, filed Sept. 4, 1981, now abandoned.

BACKGROUND OF THE INVENTION

1. Field of the Invention

The present invention relates to a tracking control apparatus for an optical information reproducing system, and more particularly, to a tracking control apparatus for an optical information reproducing system which can perform the tracking control correction regardless of the eccentricity of an optical recording carrier such as a rotary disc.

2. Description of the Prior Art

A prior art tracking control apparatus for an optical information reproducing system will be now explained with reference to FIG. 1. In the prior art, as shown in FIG. 1, a laser beam from a laser light source (not shown) is introduced through a deflection beam splitter 1 to an objective lens 2. A beam from the objective lens 2 is converged on an optical recording carrier, such as a rotary plate or disc 3, as a reference beam. The reproduced or reflected beam from the rotary disc 3 is reversed through the objective lens 2 and transmitted to the beam splitter 1, where it is reflected by the beam splitter 1 to a light receiving element or photo-detector 4.

On the signal record surface of the optical recording rotary disc 3, an information signal is recorded on disc 3 in a coaxial or spiral (nearly coaxial) optical record track. The information signal can be a PCM (pulse code modulated) video signal or the like. For example, in one prior art system, the optical record track is formed of pit trains.

As shown in FIGS. 1 and 2, the light receiving element or photo-detector 4 comprises first and second light receiving members 4a and 4b which are divided into two members by a boundary line L. The light receiving element 4 is arranged so that the tangential direction of the record track on the rotary disc 3 corresponds to the boundary line L. First and second light receiving elements 4a and 4b generate signals from which the difference between the envelopes of the respective signals is formed and used as a tracking error signal. The respective output signals from the light receiving members 4a and 4b are fed to a differential amplifier 5 functioning as a subtracter or comparator, through an envelope detecting circuit, for example, low pass filter 7. The tracking error signal delivered from the differential amplifier 5 is supplied to a tracking control device or means 6. Tracking control device 6 is an electro-mechanical transducer device which drives the objective lens 2 or tracking mirror (not shown) in response to the tracking error signal to carry out the tracking correction.

In FIG. 2, reference letter B designates a spot of the beam reflected on the light receiving element 4. Beam spot B comprises a non-diffraction beam area $B_0$ and + and − primary diffraction beam areas $B_{+1}$ and $B_{-1}$ on the peripheral portion of the non-diffraction area $B_0$. When the tracking of the reference beam is centered, the distribution of the diffracted beams of the reproduced beam is symmetrical on both sides of a line tangent to the record track and, the tracking error signal from the differential amplifier 5 is zero. When there is a tracking displacement or deviation in the reference beam, the distribution of the diffracted beams becomes asymmetrical. A tracking error signal, which has the level and polarity in response to the amount and polarity of the tracking displacement or deviation, is derived from the differential amplifier 5.

The above prior art tracking control apparatus has problems when the record track is not perfectly centered on disc 3, i.e., is eccentric. When a tracking deviation exists, the tracking control device 6 generates the tracking correction for the reference beam. The beam spot B of the reproduced beam on the light receiving element 4, however, is moved in a vertical direction with respect to the boundary line L. As a result, the output signal from the light receiving member, to which the beam spot B moves, becomes large and functions as an external disturbance for the tracking error signal, thereby making the tracking control operation unstable. This external disturbance becomes large as the eccentricity ($\pm 100\mu$) of the optical recording carrier or rotary disc 3 is large.

The external disturbance of the tracking error signal will be further described with reference to FIG. 3. FIG. 3A shows the waveform of a tracking error signal when the tracking control device 6 is not supplied with the tracking error signal. Since the dynamic range of the tracking error signal corresponds to $\frac{1}{2}$ of the track pitch, the dynamic range of the tracking error signal is accordingly very small. When an AC current, as shown in FIG. 3C, is applied to the tracking control device 6 to move the reference beam in a direction perpendicular to a line tangent to the record track, the tracking error signal of FIG. 3A is amplitude modulated by the AC current illustrated in FIG. 3C to form the signal shown in FIG. 3B. The amount of displacement generated by the tracking control device 6 is proportional to the amount of eccentricity of the rotary disc 3 in its radial direction, so that when the undulation of the tracking error signal exceeds the value corresponding to $\frac{1}{4}$ of the track pitch, no tracking control correction is applied.

OBJECTS AND SUMMARY OF THE INVENTION

Accordingly, it is an object of the present invention to provide a novel tracking control apparatus for an optical information reproducing system free from the defects encountered in the prior art.

It is another object of the invention to provide a tracking control apparatus for an optical information reproducing system which can apply the tracking correction irrespective of the eccentricity of an optical recording carrier.

According to an aspect of the present invention, a tracking control apparatus for an optical information reproducing system in which a light beam for reading the information is incident on a signal record surface of a recording carrier having a substantially circular record track is formed, comprises:

a photo-detector for detecting the light beam from the recording carrier, and for generating an information signal and a first tracking error signal responsive to the deviations of the light from the center of the record track;

tracking control means supplied with said first tracking error signal and for adjusting the position of said light beam;

generating means for measuring a second tracking error responsive to the eccentricity of the recording carrier during at least one revolution of said recording carrier; and means for supplying the second tracking error signal to the tracking control means to adjust the position of the light beam in response thereto.

Other objects, features and advantages of the present invention will become apparent from the following detailed description taken in conjunction with the accompanying drawings in which like reference numerals designate the same or similar elements or parts.

DESCRIPTION OF PREFERRED EMBODIMENTS

Figure 1:
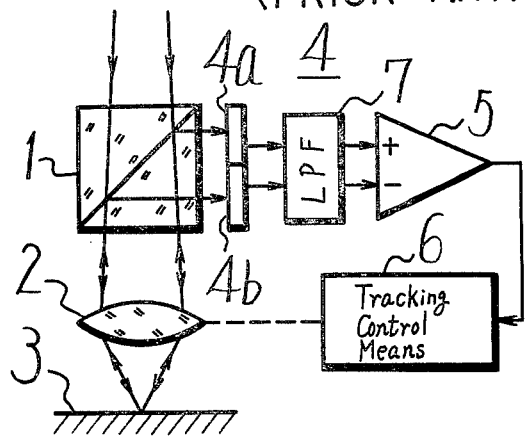
FIG. 1 is a schematic diagram showing a prior art tracking control apparatus for an optical information reproducing system.
Figure 2:
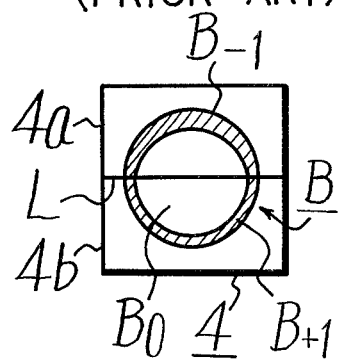
FIG. 2 is a front view of a light receiving element shown in FIG. 1.
Figure 3A:
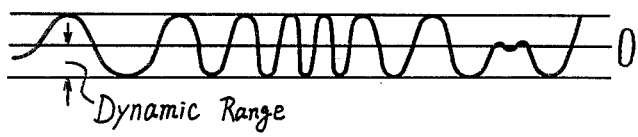
FIGS. 3A–3C is a waveform diagram used to explain the operation of the tracking control apparatus depicted in FIG. 1.
Figure 3B:
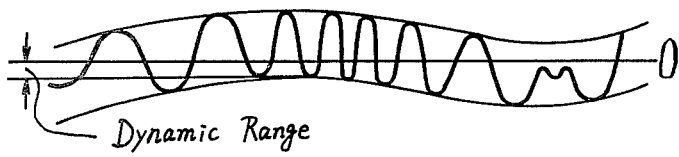
Figure 3C:
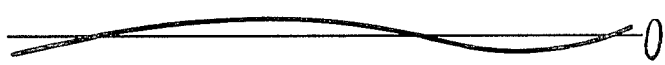
Figure 4:
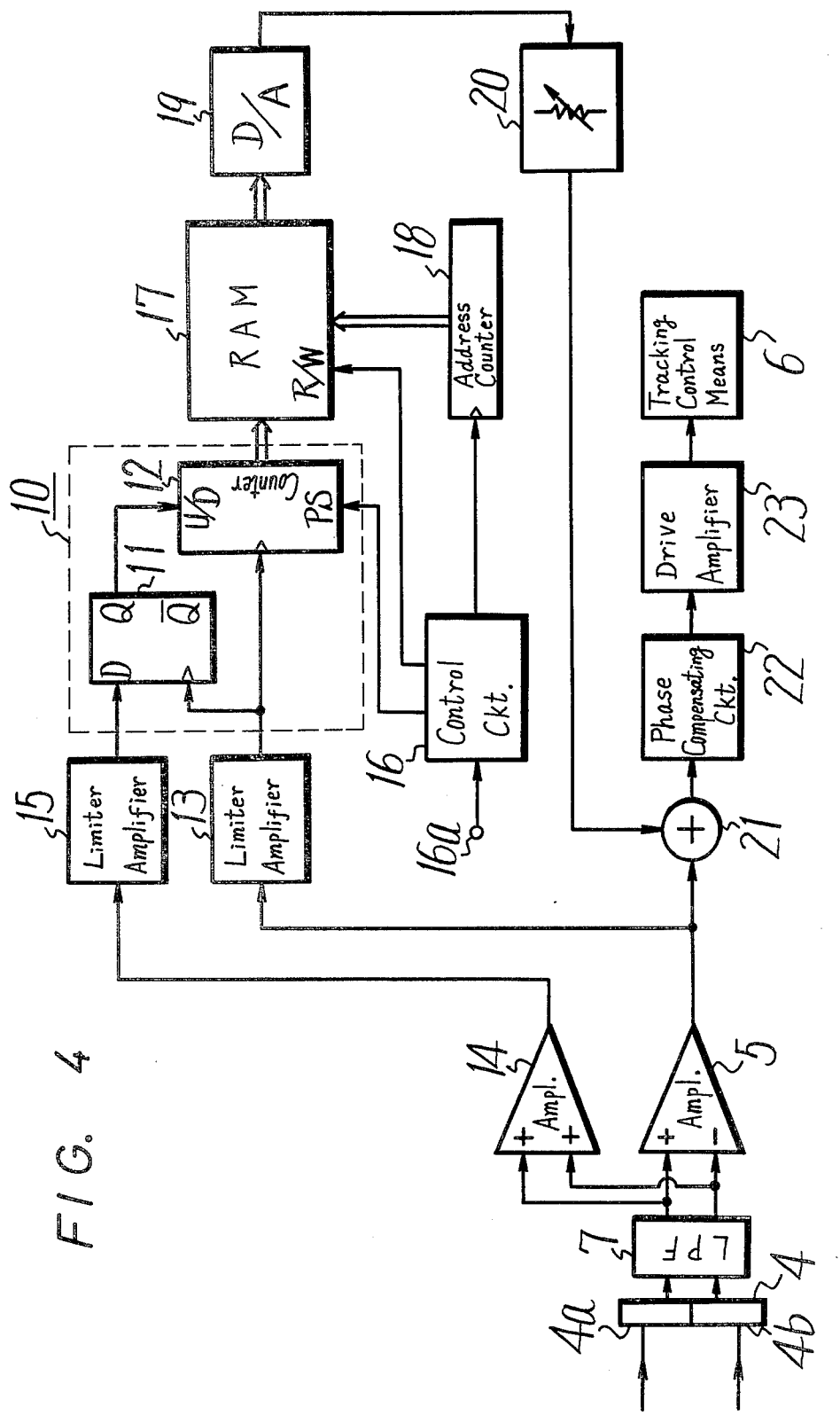
FIG. 4 is a system block diagram of a tracking control apparatus according to the present invention.

A first embodiment of the tracking control apparatus for an optical information reproducing system according to the present invention will be described with reference to FIG. 4 in which the parts or elements corresponding to those of FIG. 1 are marked with the same reference numerals and their description is not repeated here. In FIG. 4, block 10 designates a measuring device which measures the fluctuation or variation error in a direction perpendicular to a tangent of the optical record track of the eccentricity of an optical recording carrier over one revolution. Measuring device 10 includes a D-type flip-flop circuit 11 and an up-and-down counter 12. Up-and-down counter 12 is an eight bit (i.e. 0 to 255 values) presettable counter, with 128 selected as its preset value.

Figure 5A:
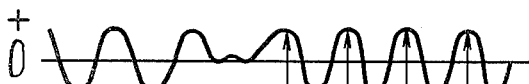
FIGS. 5A–5C is a waveform diagram used to explain the operation of the embodiment of FIG. 4.

In the illustrated embodiment of the invention in FIG. 4, a tracking error signal (shown in FIG. 5B) from a differential amplifier 5 is fed to a limiter amplifier 13 to be shaped as a rectangular waveform signal which is applied to clock input terminals of a flip-flop circuit 11 and a counter 12. The output signals from the light receiving members 4a and 4b are passed through an envelope detecting circuit, such as a low-pass filter 7, and are supplied to an amplifier 14 to be added or amplified. A traverse signal, which is the output signal from the amplifier 14 and shown in FIG. 5A, is supplied to a limiter amplifier 15 to be shaped as a rectangular waveform signal and applied to a D-input terminal of the flip-flop circuit 11. A non-inverted output Q of the flip-flop circuit 11 is supplied to an up-and-down change-over control terminal of the counter 12.

In FIG. 4, a control circuit 16 is supplied from input terminal 16a with a signal synchronized with the rotation of the rotary disc 3. When the rotating frequency of the rotary disc 3 is, for example, 30 Hz, a signal with a frequency of, for example, 32 times 30 Hz, or 960 Hz, is applied to the input terminal 16a. The counter 12 is preset at every each rotation of the rotary disc 3 by a control signal (whose frequency is 1/32 of 960 Hz) from a control circuit 16.

Figure 5B:
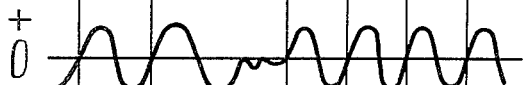

The phases of the traverse and tracking error signals shown in FIGS. 5A and 5B are shifted by 90° with respect to each other. When the tracking error signal is zero, the traverse signal becomes peak and when the tracking error signal is at its peak, the traverse signal is zero. In the illustrated embodiment, the flip-flop circuit 11 discriminates the positive or negative of the peak of the traverse signal by the rising edge of the tracking error signal. The tracking error signal is added or subtracted in response to the discriminated positive or negative value in the counter 12.

Figure 5C:
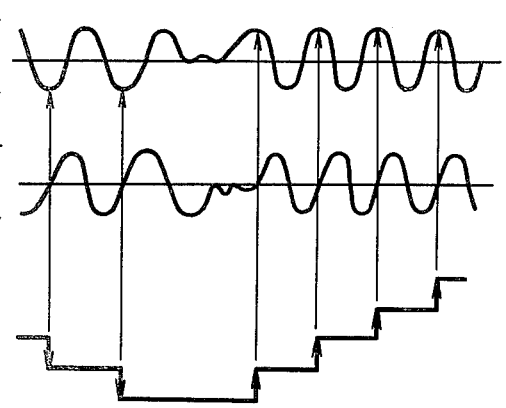

FIG. 5C shows the content of the counter 12 and represents a measure of the eccentricity of disc 3 in a direction perpendicular to a line tangent to the record track on the rotary disc 3.

The variation error signal (a digital signal) is measured by the measuring device 10 over one revolution of the rotary disc 3, and is stored in a RAM (random access memory) 17 serving as a memory device. An address counter 18 is provided for the RAM 17 which counts the pulse signal of 960 Hz supplied from the control circuit 16. The write-in and read-out operations of the RAM 17 are selected by a control signal from the control circuit 16. At the starting point of the normal rotation of the rotary disc 3 during the write-in operation, the variation error signal measured over one revolution of the rotary disc 3 by the measuring device 10 is written in the RAM 17 in about 0.1 second, in one example. During the tracking control operation, the contents of the RAM 17 are read out and applied to a digital-to-analog converter 19 to be converted to an analog signal. The analog signal is then fed to a level adjuster 20 which adjusts the level of the analog variation error signal. The adjusted analog variation error signal is then applied to an adder 21 to be added to the tracking error signal supplied from the differential amplifier 5. The output from the adder 21 is supplied to a phase compensating circuit 22 and a drive amplifier 23 to the tracking control device 6. The displacement or deviation of the beam spot B on the light receiving element 4 is compensated for or corrected by the tracking control device 6.

Figure 6:
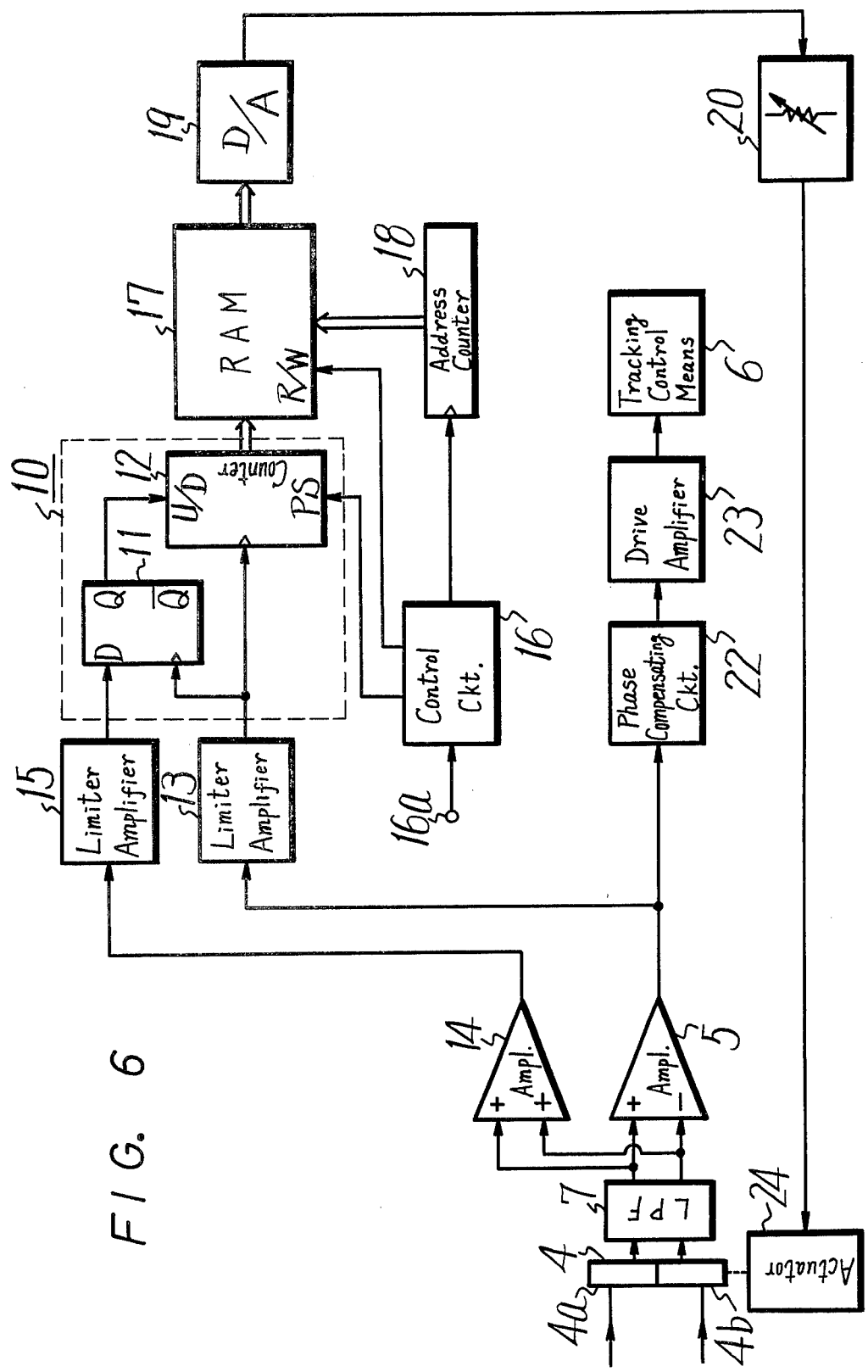
FIGS. 6 and 7 are system block diagrams showing alternate embodiments of the present invention.

Referring to FIG. 6, another embodiment of the present invention will be now described. In FIG. 6, the variation error signal is applied to an actuator 24 which moves the light receiving element 4 in a direction at right angles to the boundary line L to correct the light receiving element 4 and to thereby compensate for the positional displacement or deviation of the beam spot on the light receiving element 4 from the tracking control device 6.

Figure 7:
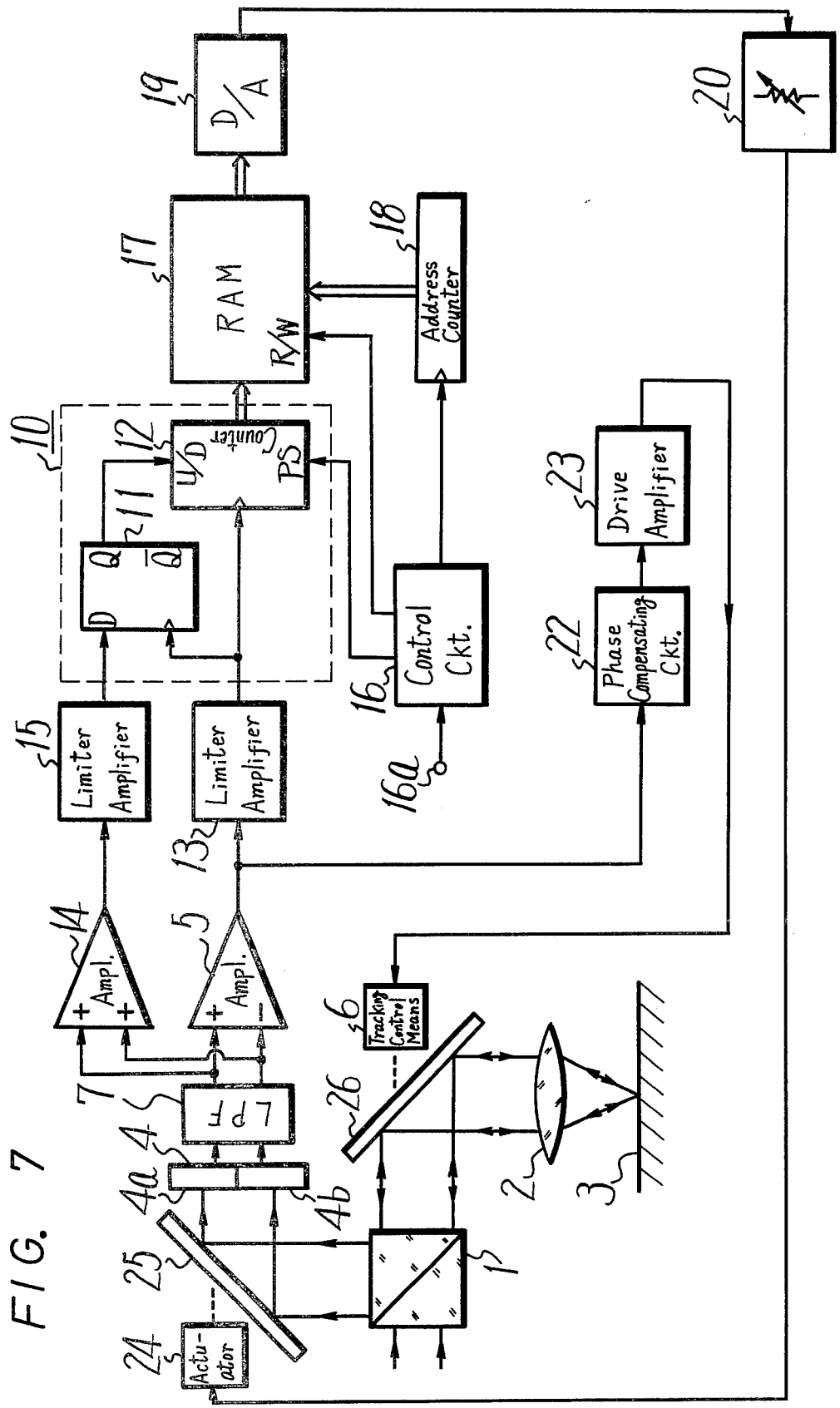

A further embodiment of the present invention will be described with reference to FIG. 7. In FIG. 7, the variation error signal is supplied to the actuator 24 which then drives a galvano-mirror 25, located in the beam path between the beam splitter 1 and the light receiving element 4, to compensate for or correct the positional displacement of the reproduced beam on the light receiving element 4 in a direction perpendicular to the boundary line L. In this example, the tracking control device 6 drives a tracking mirror 26 which is separate from the galvano-mirror 25 and is located between the objective lens 2 and the beam splitter 1.

In the above-mentioned examples of the present invention, a bi-morph, a voice coil used in a speaker, an electro-magnetic device and so on may be employed as the tracking control device 6 and the actuator 24, respectively.

It is to be recognized that the variation error signal can be measured over more than one revolution of the recording carrier and the mean value thereof can be stored in the memory device 17.

According to the tracking control apparatus for an optical information reproducing system of the present invention as described above, the tracking control can be performed irrespective of the eccentricity of the optical recording carrier, such as a rotary disc.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

We claim as our invention:

1. A tracking control apparatus for an optical information reproducing system in which a light beam for reading the information is incident on a signal record surface of a recording carrier on which a substantially circular record track is formed, comprising:

photo-detector means including first and second portions for detecting said light beam from said recording carrier and generating respective first and second outputs, and means for generating from said first and second outputs an information signal and a first tracking error signal indicative of deviations of beam position relative to the center of said record track, said information signal being the sum of said first and second outputs and said first tracking error signal being the difference between said first and second outputs;

tracking control means receiving said first tracking error signal for controlling the transverse position of said light beam with respect to said center of said record track;

measuring means for generating a digital second tracking error signal indicative of any eccentricity of said recording carrier during at least one revolution of said recording carrier, said measuring means including delayed flip-flop means with a delayed input terminal, a clock input terminal and an output terminal and providing an output signal at said output terminal, a preset up/down counter having a clock input terminal, an up/down switching control terminal and an output terminal and providing an output signal at said output terminal, said information signal from said photo-detector means being supplied to said delayed input terminal of said delayed flip-flop means, said first tracking error signal from said photo-detector means being supplied to said clock input terminals of said delayed flip-flop means and said up/down counter, said output signal of said delayed flip-flop means being supplied to said up/down switching control terminal of said counter;

memory means receiving said output of said counter for storing said digital second tracking error signal;

means for converting said digital second tracking error signal from said memory means to an analog signal; and means for supplying said analog signal from said means for converting to said tracking control means to adjust said beam position in response thereto.

2. A tracking control apparatus for an optical information reproducing system in which a light beam for reading the information is incident on a signal record surface of a recording carrier on which a substantially circular record track is formed, comprising:

photo-detector means for detecting said light beam from said recording carrier and generating therefrom an information signal and a first tracking error signal indicative of deviations of the position at which the beam is incident on said record surface relative to the center of said record track;

tracking control means responsive to at least said first tracking error signal for controlling said position of said light beam transversely with respect to said center of said record track;

measuring means for generating a second tracking error signal indicative of any eccentricity of said recording carrier during at least one revolution of said recording carrier;

memory means for storing said second tracking error signal; and means responsive to said second tracking error signal for relatively positioning said light beam from the recording carrier and said photo-detector means while said tracking control means responds to said first tracking error signal so as to avoid reduction of the dynamic range of said tracking control means as a result of said eccentricity.

3. The apparatus of claim 2; wherein said photo-detector means includes first and second portions generating first and second output signals, respectively, and means for summing said first and second output signals to derive said information signal, and means for subtracting one of said first and second output signals from the other to derive said first tracking error signal.

4. The apparatus of claim 3; wherein said measuring means includes delayed flip-flop means, and counter means connected to said delayed flip-flop means to provide said second tracking error signal in digital form.

5. The apparatus of claim 4; wherein said delayed flip-flop means has a delayed input terminal, a clock input terminal and an output terminal, and said counter means includes a present up/down counter with a clock input terminal and an up/down control terminal; said information signal is applied to said delayed input terminal, said first tracking error signal is applied to said clock input terminals of said delayed flip-flop means and said preset up/down counter, the output signal from said flip-flop means is applied to said up/down control terminal of said preset up/down counter, and the output signal from said counter is applied to said memory means.

6. The apparatus of claim 5; and further comprising digital to analog converting means for converting the digital second tracking error signal to an analog second tracking error signal.

7. The apparatus of claim 2; in which said means responsive to said second tracking error signal includes means for adding said second tracking error signal to said first tracking error signal prior to application of the latter to said tracking control means so that the relative positioning of said light beam from the recording carrier and said photo-detector means is also determined by the positioning of said light beam transversely with respect to said center of said record track.

8. The apparatus of claim 2; in which said means responsive to said second tracking error signal includes actuator means for adjusting the position of said photodetector means relative to said recording carrier in response to said second tracking error signal.

9. The apparatus of claim 2; in which said means responsive to said second tracking error signal includes second tracking control means for adjusting said light beam from the recording carrier relative to said photodetector means in response to said second tracking error signal.

10. The apparatus of claim 9; wherein said second tracking control means includes mirror means for reflecting said light beam from said recording carrier, and actuator means for adjusting the angular position of said mirror means in response to said second tracking error signal.

* * * * *